(12) United States Patent
Balogh et al.

(10) Patent No.: US 6,842,441 B2
(45) Date of Patent: Jan. 11, 2005

(54) DATA TRANSMISSION IN A WIRELESS COMMUNICATION SYSTEM

(75) Inventors: Dan Anthony Balogh, Madison, NJ (US); John K. Burgess, Morristown, NJ (US); Terry Si-Fong Cheng, Singapore (SG); Ching Yao Huang, Randolph, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 778 days.

(21) Appl. No.: 09/740,124

(22) Filed: Dec. 19, 2000

(65) Prior Publication Data

US 2002/0075827 A1 Jun. 20, 2002

(51) Int. Cl.[7] .................................................. H04Q 7/00
(52) U.S. Cl. ........................ 370/332; 370/436; 370/441; 370/462
(58) Field of Search ................................. 370/320, 342, 370/441, 477, 331–333, 229–230, 479; 455/440–443, 320, 437, 335, 342, 450, 525

(56) References Cited

U.S. PATENT DOCUMENTS

| | | | | |
|---|---|---|---|---|
| 5,491,717 A | * | 2/1996 | Hall ............................ | 370/332 |
| 5,734,646 A | * | 3/1998 | I et al. ....................... | 370/335 |
| 5,946,356 A | * | 8/1999 | Felix et al. ................. | 375/295 |
| 5,987,326 A | * | 11/1999 | Tiedemann, Jr. et al. ... | 455/442 |
| 6,069,883 A | * | 5/2000 | Ejzak et al. ................ | 370/335 |
| 6,088,578 A | * | 7/2000 | Manning et al. ............ | 455/68 |
| 6,167,270 A | * | 12/2000 | Rezaiifar et al. ........... | 455/442 |
| 6,216,004 B1 | * | 4/2001 | Tiedemann, Jr. et al. ... | 455/442 |
| 6,272,124 B1 | * | 8/2001 | Ahn et al. ................... | 370/342 |
| 6,321,089 B1 | * | 11/2001 | Han ............................ | 455/438 |
| 6,337,984 B1 | * | 1/2002 | Hong et al. ................. | 455/439 |
| 6,353,602 B1 | * | 3/2002 | Cheng et al. ............... | 370/332 |
| 6,490,268 B1 | * | 12/2002 | Lee et al. .................... | 370/342 |
| 6,546,058 B1 | * | 4/2003 | Gilhousen et al. .......... | 375/285 |
| 6,567,391 B1 | * | 5/2003 | Moon .......................... | 370/342 |
| 6,590,879 B1 | * | 7/2003 | Huang et al. ............... | 370/331 |
| 6,594,243 B1 | * | 7/2003 | Huang et al. ............... | 370/332 |
| 6,662,019 B2 | * | 12/2003 | Kamel et al. ............... | 455/522 |
| 6,671,268 B2 | * | 12/2003 | Leung ......................... | 370/342 |
| 6,697,348 B1 | * | 2/2004 | Chen et al. ................. | 370/337 |

* cited by examiner

*Primary Examiner*—Kenneth Vanderpuye
*Assistant Examiner*—Van Nguyen

(57) ABSTRACT

A method and apparatus for transmitting a burst of data over a supplemental channel on just one leg of a handoff by changing the maximum allowed burst duration of the data to be transmitted over the supplemental channel as a function of the future and/or current characteristics of the communication link of the leg(s) of the handoff. The data is then transmitted over just one leg of handoff using the maximum allowed burst duration. By changing the parameters of the data, the data may still be acceptably received at the mobile terminal over just one leg of the soft handoff even when the strength of the pilot signal used for the supplemental channel changes significantly. In an illustrative embodiment of the invention the stability of the communication link is used as a way of ascertaining the future conditions of the communications link.

27 Claims, 8 Drawing Sheets

DATA TRANSMISSION IN A WIRELESS COMMUNICATION SYSTEM

BACKGROUND OF THE INVENTION

1. Field of the Invention

This invention relates to wireless communication systems and, more particularly, to data transmission over wireless communication systems.

2. Description of Related Art

Great strides are being made in communication systems to meet the desire to transmit data at ever-increasing speeds. Particularly, this desire is currently being addressed in wireless communication systems, such as, for example, Code Division Multiple Access (CDMA) systems.

In CDMA systems generally, base stations transmit signals to mobile terminals over a communication link referred to as a forward link, and mobile terminals transmit signals to base station over a communication link referred to as a reverse link. When a call—a communication session between a base station and a particular mobile terminal—is set up, a primary channel, referred to in some systems and herein as a fundamental channel, is set up on both a forward and reverse link. The fundamental channel can be used to transmit voice, data, and/or so-called signaling information, and transmits the signal at a particular, typically a fairly low, transmission rate. If it is desired to transmit a signal at a higher transmission rate, for example for a data transmission having a large amount of data, the CDMA system checks, as described below, to determine whether system conditions allow and it is advantageous to set up a secondary channel—a communication channel over which signals may be transmitted at the same or at a higher transmission rate than that of the fundamental channel. In some systems the secondary channel is referred to as a data channel, or, as referred to herein, as a supplemental channel. The supplemental channel is typically set up only over the particular communication link, i.e. forward or reverse, over which it is desired to transmit the signal.

If system conditions allow and it is advantageous to set up the supplemental channel, the base station sets up the supplemental channel and transmits a data burst over it. According to some current standards, a signal can be transmitted over a supplemental channel at a transmission rate of one, two, four, eight, sixteen, or thirty-two times the transmission rate of a fundamental channel, which is typically 9.6 Kbits/sec. Thus, typically, data can be transmitted on the supplemental channel at a much higher transmission rate than it could have been transmitted on the fundamental channel.

The way in which the supplemental channel is set up takes account of the fact that data is often bursty, meaning that it is transmitted in bursts followed by periods of inactivity during which no data is transmitted. Typically, the supplemental channel is maintained only for the duration of each data burst. Between data bursts, there is no supplemental channel assigned to the call, but there is a fundamental channel assigned to the call.

During the call, the mobile terminal communicates with the particular base station from which the mobile terminal receives the strongest so-called pilot signal. When the mobile terminal receives fairly strong pilot signals from more than one base station, such as for example three base stations, the mobile terminal transmits signals to all three base stations and all three base stations transmit signals to the mobile terminal. In this case, the call is said to be in soft handoff and the mobile terminal and the base stations are said to be participating in the soft handoff. The communication links between one of the base stations and the mobile terminal is typically referred to as a leg of the soft handoff. When a call is in soft handoff, there is a fundamental channel on each leg of the soft handoff, and there may also be a supplemental channel on one or more of the legs of the soft handoff. (As described above, the fundamental channel exists on both the forward and reverse links, and the supplemental channel typically exists on only the communication link over which data is to be transmitted at the higher transmission rate.) Thus, the forward link is part of at least one of the legs of the handoff, and the reverse link is part of at least one of the legs of the handoff.

Having the supplemental channel on more than one leg of the soft handoff poses several problems. One problem with having the supplemental channel on more than one leg of the soft handoff is that it uses a large amount of system resources. These resources are the various system resources, which include the number of Walsh codes—orthogonal spreading sequences—available for each of these communication link(s) that the secondary channel will use, the power level available for each of these communication links, the hardware and software resources available for each of these communication links (for example the channel elements, CPU capacity, and so-called radios), and the maximum transmission rate supportable at each of these communication links.

Using a large amount of system resources can drastically reduce the system resources available at the base stations to communicate with other mobile terminals and severely limit the number of other mobile terminals with which each of these base stations is able to communicate at a particular point in time. This drastically limits the call-handling capacity of the CDMA system.

Another problem with having the supplemental channel on more than one leg of the soft handoff is that the base stations participating in the soft handoff have to co-ordinate setting up the supplemental channel which, disadvantageously, increases the set up time of the supplemental channel.

Yet another problem with having the supplemental channel on more than one leg of the soft handoff is that the supplemental channel should have the same transmission rate on each leg of the soft handoff. Typically, this means that each base station participating in the soft handoff has to notify a central location what transmission rate it can support based on its available resources. The central location then determines the transmission rate of the supplemental channel, which is typically based on the smallest transmission rate that can be supported by any of the base stations participating in the soft handoff. This is disadvantageous in that the supplemental channel will frequently be at a lower transmission rate than can be supported by some of the base stations. Thus, the supplemental channel may have a lower data transmission rate than if it had been set up between the mobile terminal and just a particular one of these base stations that could support a higher transmission rate.

Therefore, when possible, it is beneficial to be able to have a supplemental channel on fewer than all the legs of a soft handoff. Indeed, it has been proposed that the supplemental channel should be on just one leg of the soft handoff when certain criteria are met. One of these criteria is whether the strength of the pilot signal used for the supplemental channel is changing significantly. Typically, when the strength of the pilot signal used for the supplemental channel is not changing significantly it is because the mobile terminal is moving very slowly or is stationary. In such a circumstance it may be possible for the mobile terminal to receive data at an acceptable level of signal quality over just one leg of the soft handoff. Thus, having the supplemental channel over just one leg of the soft handoff is an acceptable state of affairs. As the communication continues in soft handoff, the criteria are constantly evaluated, and if there are changes that result in whether the criteria are or are not met then the number of legs of the soft handoff on which the supplemental channel would then be set up changes.

SUMMARY OF THE INVENTION

The present invention is a technique that allows the supplemental channel to be maintained on just one leg of a handoff, such as a soft or so-called softer handoff, in circumstances were the prior art required that the supplemental channel be on several legs of the handoff. In accordance with the present invention, at least one of the parameters of the data to be transmitted over the supplemental channel is changed as a function of the future and/or current characteristics of the communication link that is part of at least one of the legs of the handoff. The aforementioned controlled parameters of the data can include, for example, the maximum allowed burst duration, and the type and/or amount of error coding of the data. The data is then transmitted over just one leg of the handoff using the parameter.

By changing the parameters of the data, the data may still be acceptably received at the mobile terminal over just one leg of the soft handoff even when the strength of the pilot signal used for the supplemental channel changes significantly. The invention thus, advantageously, delays or possibly obviates the need to establish a supplemental channel over additional legs of the soft handoff. For example, reducing the maximum allowed burst duration allows the smaller data burst to arrive at the mobile terminal before the conditions of the communication link used for the supplemental channel change enough for the data to not be received at the mobile terminal at an acceptable level of signal quality. This reduces the number of system resources needed for the call, and therefore increases the capacity of the wireless communication system.

In an illustrative embodiment of the invention the stability of the communication link is used as a way of ascertaining the future conditions of the communications link. A number of factors, either alone or in combination, can be used in assessing the stability of the communication link. These factors may be based on the measurements of the pilot signal(s) or of the signal(s) on the supplemental channel.

In one embodiment of the invention, the fact that the mobile terminal and base stations are participating in a handoff is an indication of the conditions of the communication link. Particularly, the fact that the mobile terminal and base stations are participating in a handoff is an indication that the stability of the communication link has decreased and that at least one of the parameters of the data to be transmitted over the supplemental channel should be changed.

DETAILED DESCRIPTION

Figure 1:
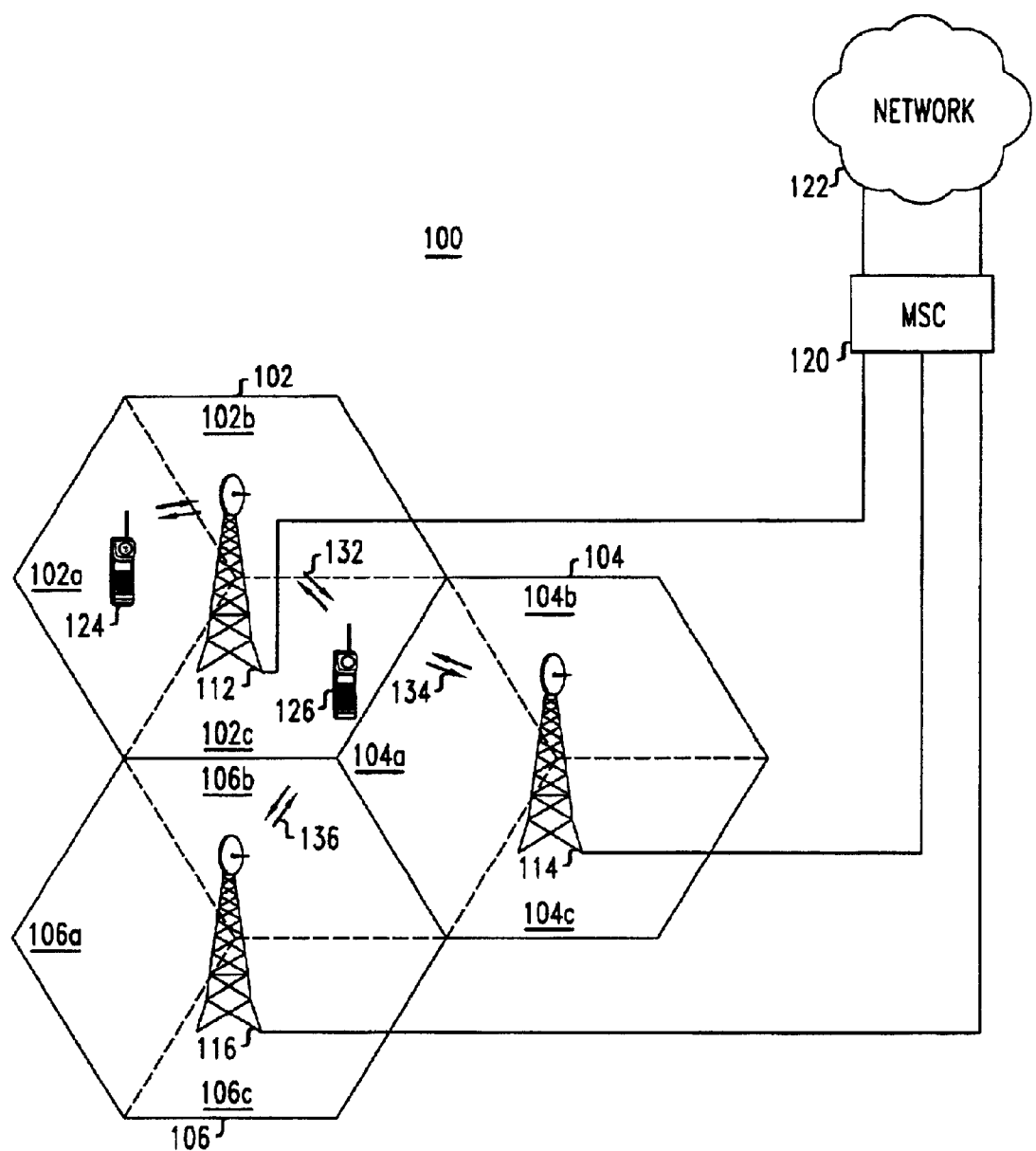
FIG. 1 illustrates a portion of a wireless communication system.

FIG. 1 illustrates a wireless communications system, such as CDMA system 100. The geographic area serviced by CDMA system 100 is divided into a plurality of spatially distinct areas called "cells." For ease of analysis cells 102, 104, and 106 are typically approximated and schematically represented by hexagons in a honeycomb pattern. However, each cell is actually of an irregular shape that depends on the topography of the terrain surrounding the cell. Each cell 102, 104, 106 can be divided into a plurality of sectors, such as three 120° sectors. Cell 102 is divided into sectors 102a, 102b, and 102c; cell 104 is divided into sectors 104a, 104b, and 104c; and cell 106 is divided into sectors 106a, and 106b and 106c. Cell 102, 104, 106 contain base stations 112, 114, 116, respectively, each of which includes equipment to communicate with Mobile Switching Center ("MSC") 120. MSC 120 is connected to local and/or long-distance transmission network 122, such as a public switched telephone network (PSTN). Each base station 112, 114, 116 also includes transmitters and/or receivers, and antennas. Typically, each base station includes different transmitters, receivers, and antennas for each sector that the base station serves. The base stations use the transmitters, receivers, and antennas to communicate with mobile terminals, such as mobile terminals 124, 126.

The base stations transmit signals to mobile terminals over a communication link referred to as a forward link, and mobile terminals transmit signals to base station over a communication link referred to as a reverse link. When a call—a communication session between a base station, for example base station 112, and a particular mobile terminal, for example mobile terminal 124—is set up in a CDMA system, a primary channel, referred to in some systems and herein as a fundamental channel, is set up on both the forward and reverse links. The fundamental channel can be used to transmit voice, data, and/or so-called signaling information, and transmits the signal at a particular, fairly low, transmission rate. If it is desired to transmit a signal at a higher transmission rate, for example for a data transmission having a large amount of data, the CDMA system checks, as described below, to determine whether system conditions allow and it is advantageous to set up a secondary channel—a communication channel over which signals may be transmitted at the same or at a higher transmission rate than that of the fundamental channel. In some systems the secondary channel is referred to as a data channel, or, as referred to herein, as a supplemental channel. The supplemental channel is typically set up only over the forward link when data is to be transmitted from base station 112 to mobile terminal 124, and only over the reverse link when data is to be transmitted from mobile terminal 124 to base station 112.

To determine whether system conditions allow and it is advantageous to set up a supplemental channel, the system first determines if the equipment allows for the higher transmission rate data transmission. This is typically done by determining if base station 112 is designed to transmit on a supplemental channel and mobile terminal 124 is designed to receive on a supplemental channel.

If the equipment allows for the higher transmission rate, then the system determines if it is advantageous to set up the supplemental channel by determining if the amount of data to be transmitted is large enough to warrant setting up a supplemental channel. Typically, there is a certain amount of set up time involved in setting up the supplemental channel, including the time to determine the amount of resources available for the supplemental channel and the time to allocate these resources. Data is not transmitted during this set up time. In order for the data to be transmitted on the supplemental channel in less time than would be needed to transmit the data over the fundamental channel, the amount of data to be transmitted has to be larger than the amount of data that would be transmitted on the fundamental channel in less time than on the supplemental channel considering that the supplemental channel is not transmitting data during the set up time. This amount of data is the minimum allowed data size. When the amount of data to be transmitted is smaller than the minimum allowed data size then the data could be transmitted on the fundamental channel in less time than would be needed to set up the supplemental channel and transmit the data over it. Therefore, it is advantageous to set up the supplemental channel when the amount of data to be transmitted is larger than the minimum allowed data size.

If the equipment allows for the higher transmission rate and it is advantageous to set up the supplemental channel, the system then determines the amount of resources available for the supplemental channel. This determination includes determining the amount of power available at base station 112 and the number of Walsh codes—orthogonal spreading sequences—available for each of these communication link(s) that the secondary channel will use, the power level available for each of these communication links, the hardware and software resources available for each of these communication links (for example the channel elements, CPU capacity, and so-called radios), and the maximum transmission rate supportable at each of these communication links.

If system conditions allow and it is advantageous to set up the supplemental channel, the base station sets up the supplemental channel and transmits a data burst over it. According to current standards, a signal can be transmitted over a supplemental channel at a transmission rate of one, two, four, eight, sixteen, or thirty-two times the transmission rate of a fundamental channel, which is typically 9.6 Kbits/sec. Therefore, the transmission rate of a supplemental channel can be 9.6 Kbits/sec, 19.2 Kbits/sec, 38.4 Kbits/sec, 76.8 Kbits/sec, 153.6 Kbits/sec, or 307.2 Kbits/sec. Thus, typically, data can be transmitted on the supplemental channel at a much higher transmission rate than it could have been transmitted on the fundamental channel.

Figure 2:
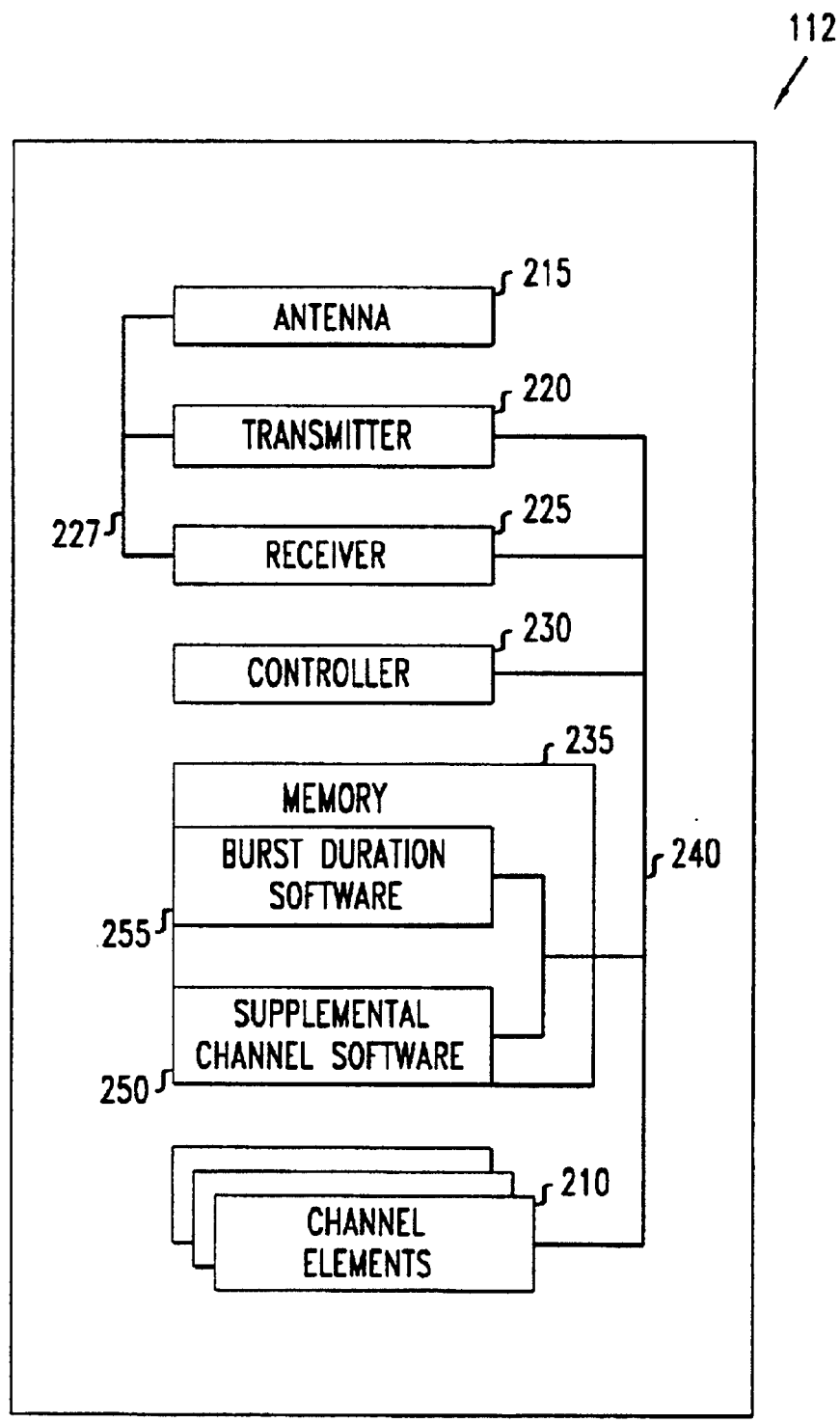
FIG. 2 illustrates a portion of a base station that can be used in the wireless communication system of FIG. 1.

FIG. 2 shows base station 112 in more detail. Base station 112 includes antenna 215, transmitter 220 for processing signals for transmission to the mobile terminal, and receiver 225 for processing signals received from the mobile terminal, all coupled to each other via bus 227. The base station also includes controller 230, memory 235, and channel elements 210, with each signal being the output of one of the channel elements 210. The controller 230, memory 235, channel elements 210, transmitter 220 and receiver 225 are coupled to each other via bus 240. Base station 112 may also include other elements (not shown) useful in the operation of base station 112. Memory 235 includes supplemental channel software 250 that controller 230 can execute to obtain the above-described determinations of whether it is advantageous to set up the supplemental channel and the amount of resources available for the supplemental channel. In one embodiment that is in accordance with the principles of the invention, memory 235 also includes burst length software 255. Burst length software 255 is implemented in accordance with principles of the present invention and will be described in more detail below.

Based on the resources available at the base station and the supplemental channel requirements, controller 230 determines the supportable transmission rate for the supplemental channel and base station 112 sets up the supplemental channel. The way in which the supplemental channel is set up takes account of the fact that data is often bursty, meaning that it is transmitted in bursts followed by periods of inactivity during which no data is transmitted. Typically, the supplemental channel is maintained only for the duration of each data burst. Between data bursts, there is no supplemental channel assigned to the call, but there is a fundamental channel assigned to the call.

Once the supplemental channel has been set up, base station 112 transmits a data burst over it. The data in the data burst can represent any type of information, including encoded voice. The signaling information—communications that control the communications links between the base station and the mobile terminal—for the data burst is transmitted over the fundamental channel. The fundamental channel can also be used to transmit data and/or to retransmit any data that was not received with an acceptable level of signal quality. Optionally, instead of transmitting the signaling information on the fundamental channel it can be transmitted over a so-called dedicated control channel.

The base station with which mobile terminal 124 communicates is the particular base station from which mobile terminal 124 receives the strongest pilot signal—a direct-sequence spread spectrum signal transmitted continuously by each base station. As shown in FIG. 1, when the mobile terminal, for example mobile terminal 126, receives fairly strong pilot signals from more than one base station, such as for example base stations 112, 114 and 116, mobile terminal 126 transmits signals to all three base stations 112, 114, and 116 and all three base stations 112, 114, and 116 transmit signals to mobile terminal 126. In this case, the call is said to be in soft handoff and mobile terminal 126 and base stations 112, 114, and 116 are said to be participating in the soft handoff. The link between one of the base stations and mobile terminal 126 is typically referred to as a leg of the soft handoff, so there is one leg 132, 134, and 136 between mobile terminal 126 and each of the base stations 112, 114, and 116, respectively.

When a call is in soft handoff, there is a fundamental channel on each leg 132, 134, and 136, and when it is desired to transmit data at a transmission rate higher than that of the fundamental channel, there can also be a supplemental channel on one or more of the legs. (As described above, the fundamental channel exists on both the forward and reverse links, and the supplemental channel typically exists on only the communication link over which data is to be transmitted.) Thus, the forward link is part of at least one of the legs of the handoff, and the reverse link is part of at least one of the legs of the handoff.

Having the supplemental channel on more than one leg poses several problems, as noted earlier. Therefore, as also noted earlier, it is beneficial, when possible, to be able to have a supplemental channel on fewer than all the legs of a soft handoff. Indeed, it has been proposed that the supplemental channel should be on just one leg of the soft handoff when certain criteria are met. One of these criteria is whether the strength of the pilot signal used for the supplemental channel is changing significantly. Typically, when the strength of the pilot signal used for the supplemental channel is not changing significantly it is because the mobile terminal is moving very slowly or is stationary. In such a circumstance it may be possible for the mobile terminal to receive data at an acceptable level of signal quality over just one leg of the soft handoff. Thus, having the supplemental channel over just one leg of the soft handoff is an acceptable state of affairs. As the communication continues in soft handoff, the criteria are constantly evaluated, and if there are changes that result in whether the criteria are or are not met then there is change in the number of legs of the soft handoff on which the supplemental channel would be set up.

The present invention is a technique that allows the supplemental channel to be maintained on just one leg of a soft handoff in circumstances were the prior art required that the supplemental channel be on several legs of the handoff, allowing the advantages resulting from the supplemental channel being only on one leg to be realized more frequently. The leg on which the supplemental channel is maintained is typically the anchor leg, which is the leg that is between the mobile terminal and the anchor base station—the base station from which the mobile terminal receives the strongest pilot signal. In accordance with the present invention, at least one of the parameters of the data is controlled as a function of the future and/or current conditions of the communication link associated with one of the base stations participating in the handoff.

The aforementioned controlled parameters of the data can include, for example, the maximum allowed burst duration, and the type and/or amount of error coding of the data. By changing the parameters of the data, the data may still be received at mobile terminal 126 over just one leg of the soft handoff at an acceptable level of signal quality even when the strength of the pilot signal used for the supplemental channel changes significantly. (Where an acceptable level of signal quality is received with an acceptable number of non-correctable errors for the particular type of transmission.) For data transmissions, a typical acceptable frame error transmission rate—the number of frame errors divided by the total number of frames observed—is 1% to 10% depending on the number of times the signal is allowed to be retransmitted.

The invention thus, advantageously, delays or possibly obviates the need to establish the supplemental channel over additional legs of the soft handoff. For example, reducing the maximum allowed burst duration allows the smaller data burst to arrive at mobile terminal 126 before the conditions of the communication link used for the supplemental channel change enough for the data to not be received at mobile terminal 126 at an acceptable level of signal quality. This reduces the number of resources needed for the call, and therefore increases the capacity of the wireless communication system.

In an illustrative embodiment of the invention, the stability of the communication link is used as a way of estimating the future conditions of the communications link. A number of factors, either alone or in combination, can be used in assessing the stability of the communication link. One of these factors is just the fact that the call is in soft handoff. Particularly, in one embodiment of the invention the fact that the call is in soft handoff is an indication that the stability of the communication link has decreased and that at least one of the parameters of the data to be transmitted over the supplemental channel should be changed. In other embodiments of the invention, the factors that can be used in assessing the stability of the communication link may be based on the measurements of the pilot signal(s) and/or of the signal(s) on the supplemental channel. These factors may include the relative strength of the anchor base station's pilot signal with respect to the non-anchor base stations' pilot signals; the rate of change of the strength of the anchor base station's pilot signal; the strength of the anchor base station's pilot signal; and the magnitude of the change of the strength of the anchor base station's pilot signal; the rate of change of the strength of the signals on the supplemental channel; the magnitude of the change of the strength of the signals; the strength of the signals; and whether a particular base station continues to serve as the anchor base station, i.e. the base station from which the mobile terminal is receiving the strongest pilot signal during a soft handoff.

Figure 3:
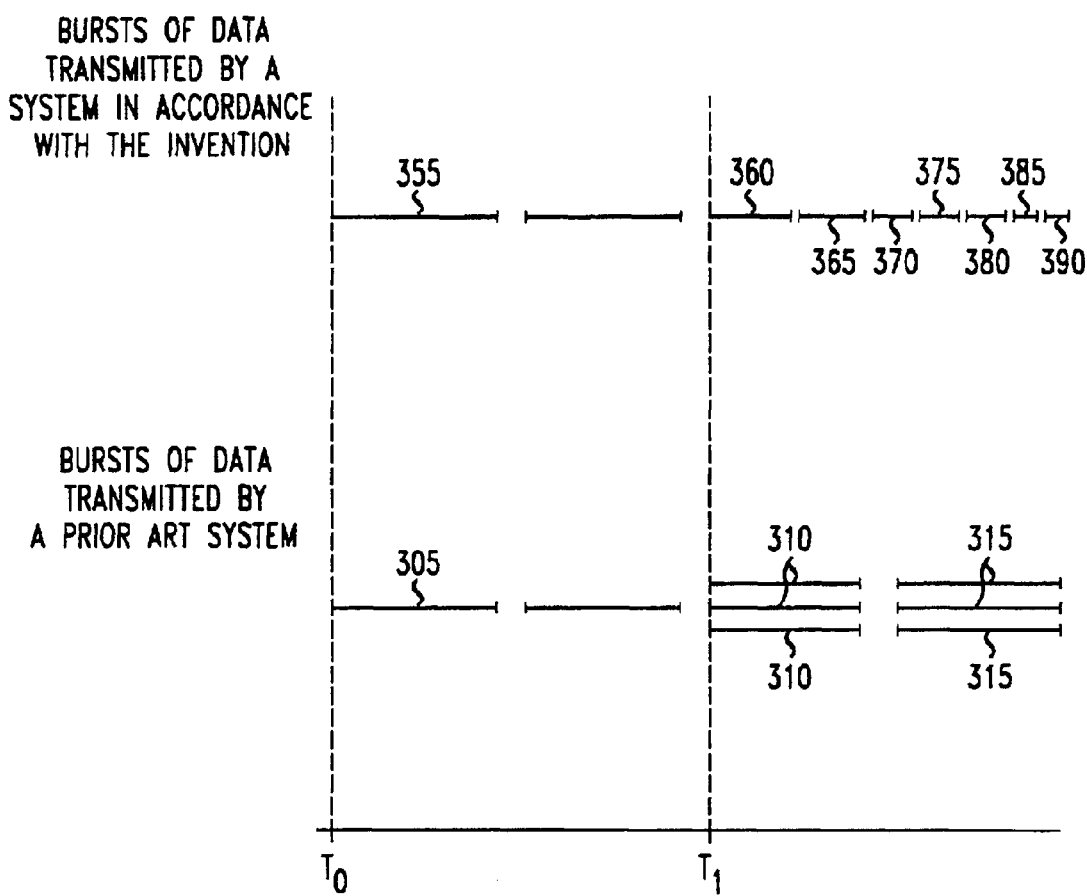
FIG. 3 illustrates the duration of the bursts transmitted in a system in accordance with the present invention compared to the duration of the bursts transmitted in a system in accordance with the prior art.

An example of some of the advantages of the present invention, particularly how the invention delays or possibly obviates the need to establish the supplemental channel over additional legs of the soft handoff, is now described with reference to FIG. 3. As can be seen in FIG. 3, at time $T_0$ the forward link is stable enough to be able transmit a burst of data, such as bursts 305 and 355, over just one leg of the handoff in both the prior art system and in the system in accordance with the present invention.

As conditions deteriorate, at time $T_1$ the forward link is not stable enough for the prior art system to receive a burst or data with an acceptable level of signal quality over just one leg, so the prior art transmits a burst of data, burst 310, over all three legs of the handoff. However, the system in accordance with the present invention changes the duration of the burst of data, burst 360, to allow the burst of data to be received with an acceptable level of signal quality over just one leg of the handoff. As conditions continue to deteriorate, according to one embodiment of the invention, the duration of the bursts continue to be reduced to allow the burst of data to be received with an acceptable level of signal quality over just one leg of the handoff. The bursts of data are transmitted until all of the data is transmitted. As can be seen in FIG. 3, the prior art system has to transmit several bursts of data, 310 and 315 over three legs of the handoff. However the system in accordance with the present invention is able to transmit all of the bursts of data, 360, 365, 370, 375, 380, 385, and 390 over just one leg of the handoff with the data still being received with an acceptable level of signal quality. This is accomplished by transmitting a burst of data over just one of the legs using a first plurality of burst parameters, and, as the characteristics of the forward link deteriorate, selection a second plurality of burst parameters at least one of which is different from the first plurality of burst parameters. In this case this different parameter is the maximum allowed burst duration. Another burst of data is then transmitted over just one of the legs using the second set of burst parameters.

Figure 4A:
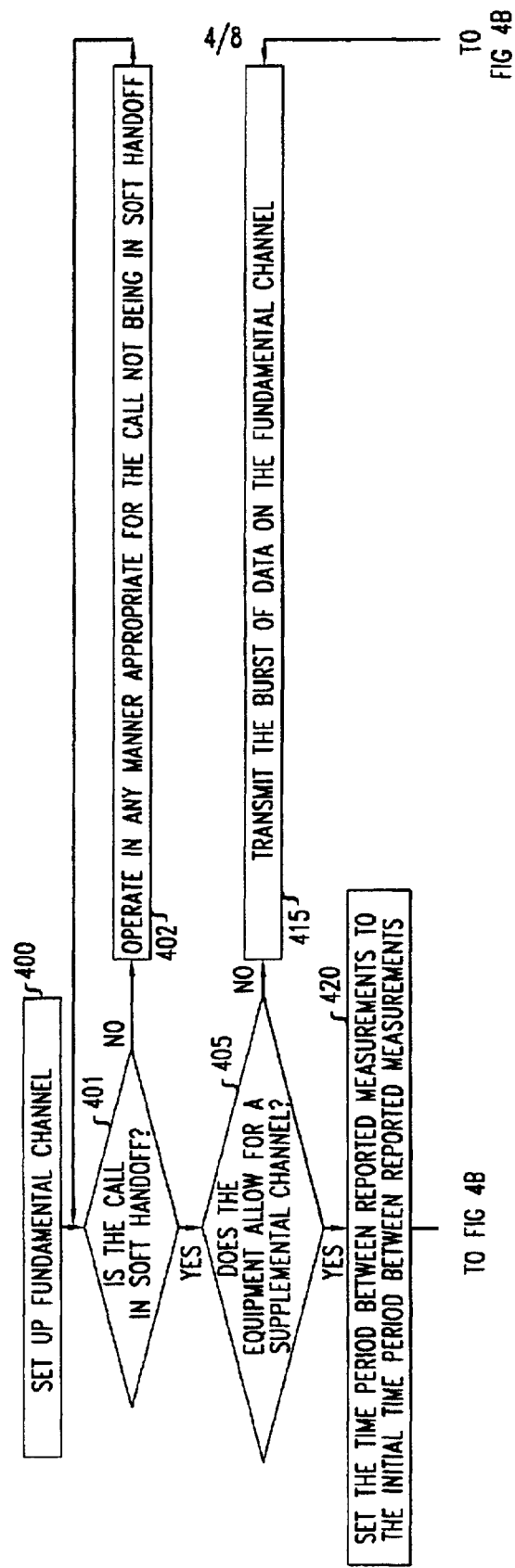
FIG. 4 is a flowchart showing an illustrative supplemental-channel-establishment technique and embodying the principles of one embodiment of the present invention.
Figure 4B:
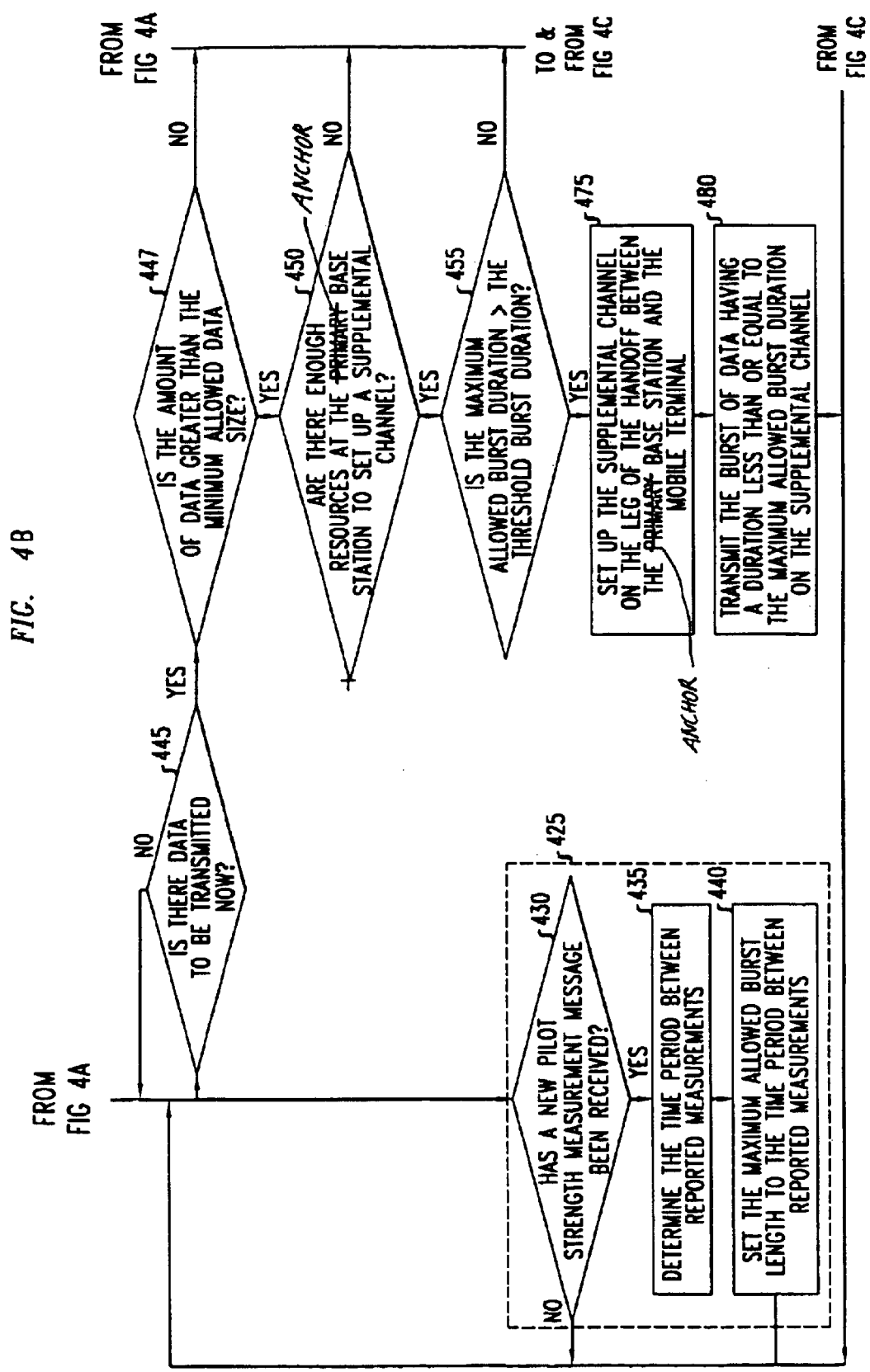
Figure 4C:
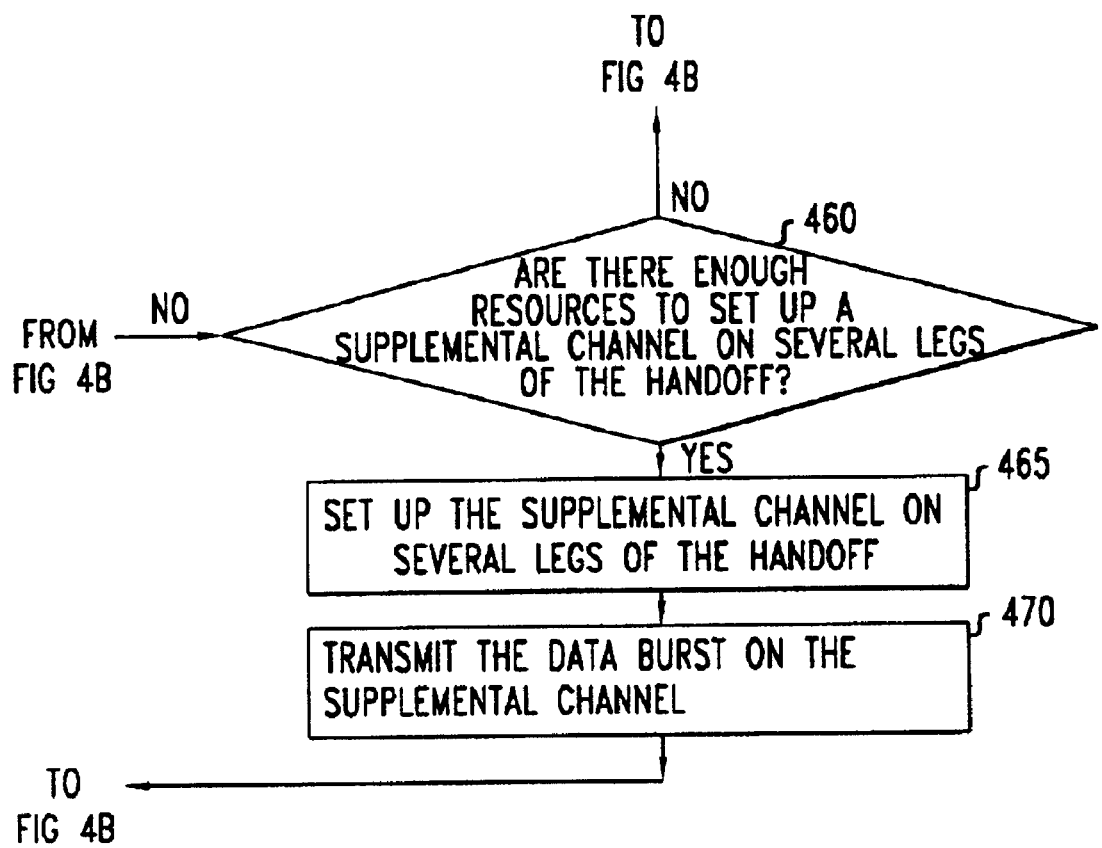
Figure 6:
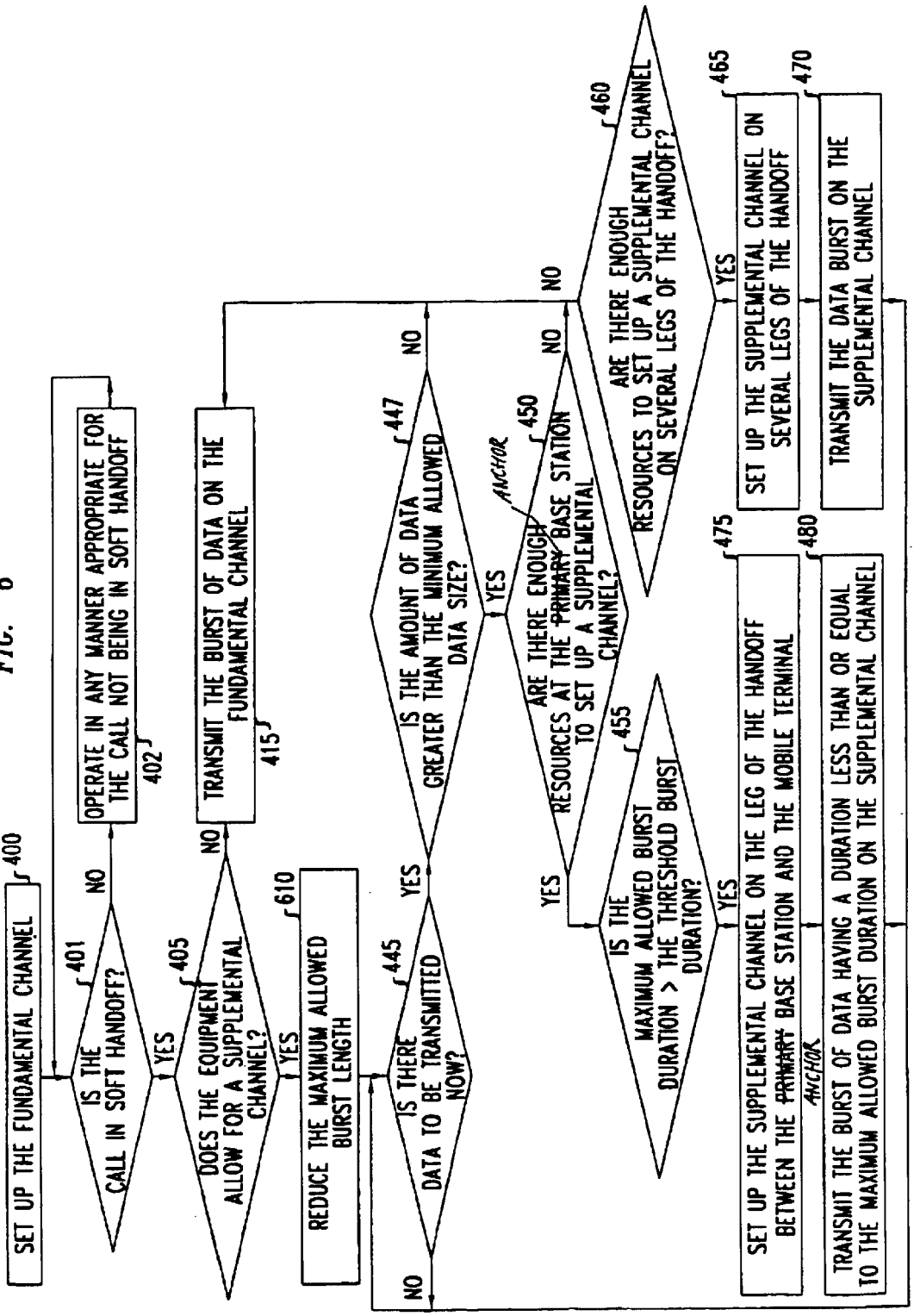
FIG. 6 is a flowchart showing an illustrative supplemental-channel-establishment technique and embodying the principles of another embodiment of the present invention.

FIG. 4 illustrates the flow of the process of operation of CDMA system 100, where the base stations 112, 114, 116 of FIG. 1 include burst length software 255 in accordance with an embodiment of the present invention. FIG. 6 illustrates the flow of another embodiment of the process of operation of CDMA system 100, where the base stations 112, 114, 116 of FIG. 1 include burst length software 255 in accordance with another embodiment of the present invention. Burst length software 255 can be used to determine the stability of the communication link associated with one of the base stations participating in the handoff and the maximum allowed burst duration that can be acceptably received by the mobile terminal based on the determined stability. Burst length software 255 can be part of the supplemental channel software 250 or, as shown in FIG. 2, it can be separate software.

The processes of FIGS. 4 and 6 determine the characteristics of the communication channel, and use the characteristics of the communication channel to determine the maximum allowed burst duration. Data is packed into busts of data whose length is at most the maximum allowed burst duration and then these bursts of data are transmitted in step 480. The data in the burst can represent any type of information, including encoded voice. Because the duration of the burst is at most the maximum allowed burst duration, which is determined using the characteristics of the communication channel, the burst can arrive at the mobile terminal before the characteristics of the communication link change enough for the data to not be received at the mobile terminal at an acceptable level of signal quality. This reduces the amount of resources needed for the call, and therefore increases the capacity of the wireless communication system.

When a call is set up between base station 112 and mobile terminal 126, base station 112 sets up a fundamental channel on the forward link between itself and mobile terminal 126, as indicated in step 400. It is then determined if the call has entered soft handoff, step 401. This determination is typically performed throughout the call. If the call is not in soft handoff the system operates as described above for a call not in soft handoff, or in any other manner appropriate for a call that is not in soft handoff, step 402.

When the call enters soft handoff each of the base stations 112, 114 and 116 participating in the soft handoff that does not already have a fundamental channel on the forward link between it and mobile terminal 126 then sets up such a fundamental channel. Typically, there will also be a fundamental channel set up on each of the reverse links between mobile terminal 126 and base stations 112, 114, and 116.

The primary base station, in this case base station 112, then determines whether the equipment allows for a supplemental channel, step 405. This is typically done by determining if the base stations are designed to transmit on a supplemental channel and mobile terminal is designed to receive on a supplemental channel. If the answer in step 405 is NO, the primary base station proceeds to step 415 and all of the base stations participating in the soft handoff transmit the data on the fundamental channel.

If the answer in step 405 is YES the stability of the forward link is determined. The stability is then used to determine the maximum allowed burst duration.

One method of determining the stability of the forward link is based on 1) the characteristics of the anchor base station's pilot signal compared to the characteristics of the non-anchor base stations' pilot signals and 2) the changes of the characteristics of the anchor base station's pilot signal between two or more, illustratively consecutive, measurements of this pilot signal.

Typically, the measurements of the base stations' pilot signals are reported from the mobile terminal to the base stations in a pilot signal strength measurement message. The mobile terminal measures the pilot strength and sends a pilot signal strength measurement to each of the base stations with which it is communicating. While the same base station remains the anchor base station there is a predetermined time period between the reported measurements. Preferably, the time period between reported measurements is the time during which the anchor base station's forward link, i.e. the forward communication link between the anchor base station and the mobile terminal, is stable. Whether this communication link is stable can be determined by for example the criteria described below with regard to FIG. 5.

If the answer in step 405 is YES, the time period between reported measurements is initially set to an initial time period between reported measurements, step 420. The initial time period between reported measurements is selected to be a time duration during which the anchor base station's forward communication link is stable a certain percentage of the time. The duration of the initial time period between reported measurements is a tradeoff between a) the desire to be more sure that the communication link is stable, to increase the likelihood that the burst of data would be received before the communication link deteriorated, and b) the desire to lengthen the time period between reported measurements, to be able to transmit a longer burst of data. For example, in a conservative system the initial time period between reported measurements is selected to be the time length for which the anchor base station's forward communication link is stable 50% of the time that the wireless communication system operates in soft handoff. This time length can be obtained from either empirical testing or from a simulation of the wireless communication system. For example, the initial time period between reported measurements could be set to 2 seconds.

After setting the time period between reported measurements to the initial time period between reported measurements, anchor monitoring process 425 is started and in the illustrative embodiment of the invention anchor monitoring process 425 is performed until the call is no longer in soft handoff. Thus, in the illustrative embodiment anchor monitoring process 425 is performed concurrently with the other steps performed when the call is in soft handoff, such as, for example, step 445 of checking if data is to be transmitted and the steps, described below, that follow when the answer to step 445 is YES. (Alternatively, the anchor monitoring process can be performed for certain predetermined time periods, or only when a supplemental channel is requested.)

Anchor monitoring process 425 monitors 1) the characteristics of the anchor base station's pilot signal compared to the characteristics of the non-anchor base stations' pilot signals and 2) the changes of the characteristics of the anchor base station's pilot signal between two or more, illustratively consecutive, measurements of this pilot signal. This is accomplished by first checking if a new pilot signal strength measurement message was received, step 430. The mobile terminal sends a pilot signal strength measurement to each of the base stations with which it is communicating once during each time period between reported measurements. Additionally, the mobile terminals send a pilot strength measurement message when the identity of the anchor base station changes. Until there is a new pilot signal strength message the answer to step 430 is NO and the process waits and then returns to step 430 to check again. If a new pilot signal strength message is received, the answer to step 430 is YES and the time period between reported measurements is determined, step 435.

Figure 5:
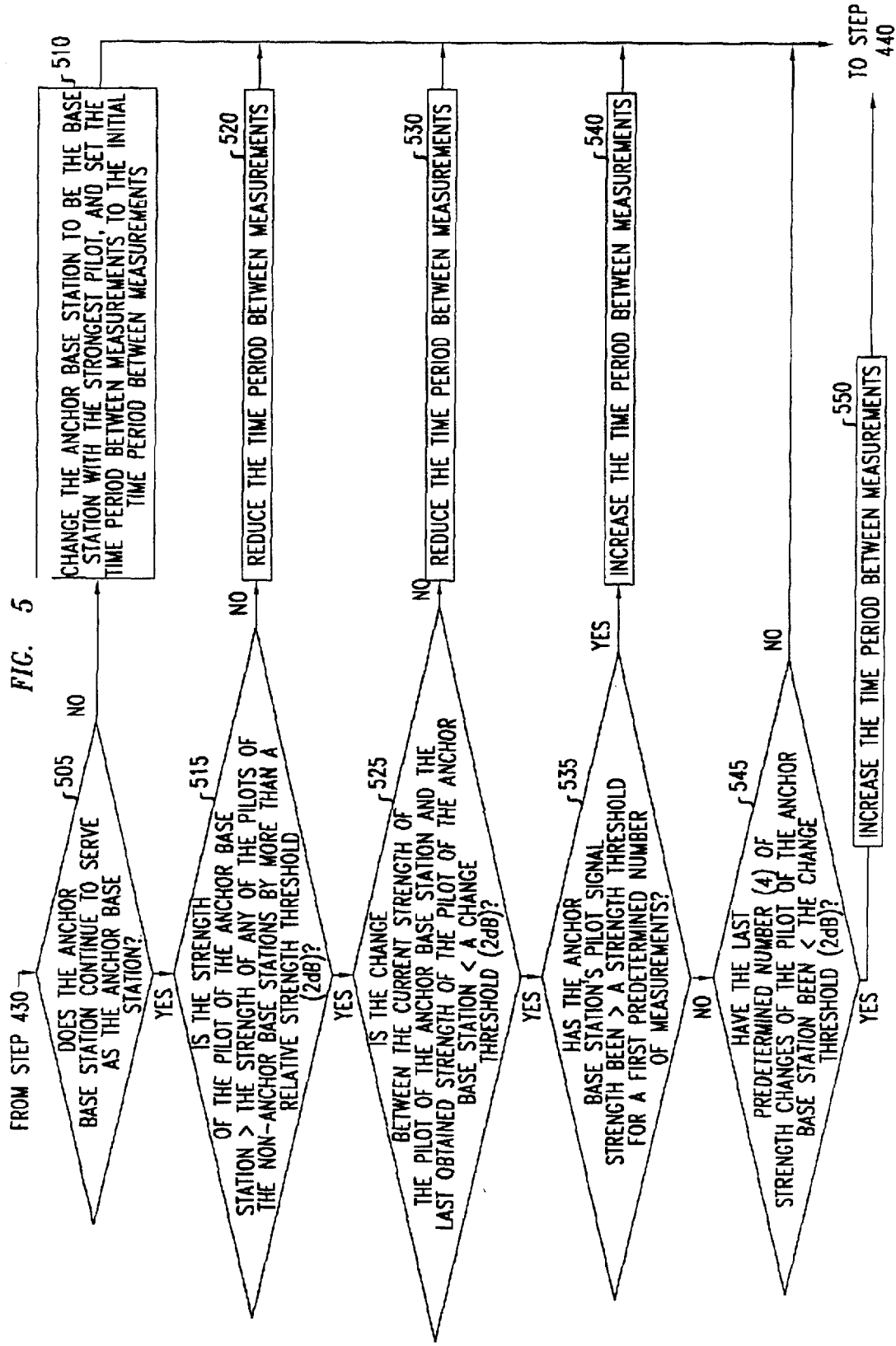
FIG. 5 is a flowchart of a time length measurement step shown in FIG. 4.

FIG. 5 shows the flow of one illustrative process of implementing step 435. A number of factors, either alone or in combination, are used in the process shown in FIG. 5 to assess the stability of the anchor base station's forward link. These factors include whether a particular base station continues to serve as the anchor base station; the relative strength of the anchor base station's pilot signal with respect to the non-anchor base stations' pilot signals; the rate of change of the strength of the anchor base station's pilot signal; the strength of the anchor base station's pilot signal; and the magnitude of the change of the strength of the anchor base station's pilot signal. Although the above criteria are used in the illustrative process, other criteria can be used in addition to or instead of the above criteria to assess the stability of the communication link. Some of these other criteria can include the rate of change of the strength of the signals on the supplemental channel; the magnitude of the change of the strength of the signals on the supplemental channel; and the strength of the signals on the supplemental channel.

FIG. 5 is now described in more detail. The primary base station checks to see if the anchor base station is to continue to serve as the anchor base station based on the received pilot signal strength measurement message, as indicated in step 505. The primary base station does this by checking which pilot signal is the strongest pilot signal received at the mobile terminal. If the anchor base station's pilot signal is still the strongest pilot signal then the anchor base station continues to serve as such. If the answer in step 505 is NO, then the base station whose pilot signal is the strongest reported pilot signal in the pilot signal strength measurement message is set as the anchor base station. This base station sets the time period between reported measurements to the initial time period between reported measurements, step 510. The process then proceeds to step 440, shown in FIG. 4 and described below.

If the answer in step 505 is YES then the primary base station checks, in step 515, the relative strength of the anchor base station's pilot signal with respect to the non-anchor base stations' pilot signals. The primary base station does this by determining if the strength of the pilot signal of the anchor base station is greater than the strength of the pilot signals of any of the non-anchor base stations by more than a relative strength threshold, such as for example 2 dB. The relative strength threshold is selected as a tradeoff between the desire to be more sure that the communication link is stable to increase the likelihood that the data burst would be received before the communication link deteriorated and the desire to lengthen the time period between reported measurements to be able to transmit a longer data burst duration. Illustratively, all of the thresholds used in the anchor monitoring process, described below, are a result of such a tradeoff.

If the answer in step 515 is NO, then the time period between reported measurements is reduced, such as for example by dividing it by 2, step 520. The size of this reduction is also selected as a tradeoff between the desire to be more sure that the anchor base station's forward link is stable and the desire to lengthen the time period between reported measurements. The process then proceeds to step 440, shown in FIG. 4 and described below.

If the answer in step 515 is YES then the primary base station checks in step 525 if the change from the last measurement to the current measurement in the strength of the anchor base station's pilot signal is less than a change threshold, for example 2 dB. If the answer in step 525 is NO, then the time period between reported measurements is reduced, for example by dividing it by 2, step 530. The size of this reduction is selected similarly to the above-described reduction, and can be equal to the above described reduction. The process then proceeds to step 440, shown in FIG. 4 and described below.

If the answer in step 525 is YES then the primary base station checks in step 535 whether the strength of the anchor base station's pilot signal for a first predetermined number of measurements, for example 2, is greater than a strength threshold, for example −7 dB. The first predetermined number of measurements is selected a tradeoff between the desire to be more sure that the anchor base station's forward link is stable and the desire to increase the time period between reported measurements. If the answer in step 535 is YES, then the time period between reported measurements is increased, such as by multiplying it by for example 2, step 540. The size of this increase is selected similarly to the above-described reductions, and can be equal in magnitude to the above-described reductions. The process then proceeds to step 440, shown in FIG. 4 and described below.

If the answer in step 535 is NO then the primary base station checks in step 545 whether for a second predetermined number of measurements, for example 4, the change in the strength of the anchor base station's pilot signal between two consecutive measurements is less than the change threshold. The second predetermined number of measurements is selected similarly to the first predetermined number of measurements. If the answer in step 545 is NO, then the time period between reported measurements is not changed, and the process proceeds to step 440, shown in FIG. 4 and described below. If the answer in step 545 is YES, then the time period between reported measurements is increased, by for example multiplying it by 2, step 550. The size of this increase is selected similarly to the above-described increase, and can be equal to the above-described increase. The process then proceeds to step 440, shown in FIG. 4.

Once the time period between reported measurements is determined, the maximum allowed burst duration is set to the time period between reported measurements, step 440. As described above, the time period between reported measurements is the time during which the pilot signal is stable. Therefore, a burst of data whose duration is less than or equal to the time period between reported measurements will be received at the mobile terminal before the conditions of the communication link change enough for the data to not be received at an acceptable level of signal quality. In other words if the duration of the data burst is less then the time period between reported measurements the data bust will most likely be received at the mobile terminal at an acceptable level of signal quality.

Concurrently with anchor monitoring process 425, the primary base station determines if data is to be transmitted, step 445. Typically, the MSC notifies the primary base station—the base station that performs the signal processing during a soft handoff—when the MSC has data that is to be transmitted to one of the mobile terminals communicating with the primary base station, for example by requesting that a supplemental channel be set up. If data is not to be transmitted the process waits and goes back to step 445 and checks again. If data is to be transmitted, i.e. the answer in step 445 is YES, the primary base station 112 also determines if it is advantageous to set up a supplemental channel on the forward link, by, as described above, determining if the amount of data to be transmitted during the data call is greater than the minimum allowed data size, step 447. If the answer in step 447 is NO, the process proceeds to step 415 and all of the base stations participating in the soft handoff transmit the data on the fundamental channel. If the answer in step 447 is yes the anchor base station determines if there are enough resources available at the anchor base station to set up the supplemental channel on this leg of the handoff, step 450. If there are not enough resources for the supplemental channel, i.e. the answer in step 450 is NO, the process proceeds to step 415 and transmits the data burst on the fundamental channel.

If there are enough resources to set up the supplemental channel, the primary base station determines whether the maximum allowed burst duration, which as described above is adjusted in the anchor monitoring process, is large enough for it to be advantageous to set up the supplemental channel for a data burst of this size, step 455. As described above, when the amount of data to be transmitted is smaller than the minimum allowed data size then the data could be transmitted on the fundamental channel in less time than would be needed to set up the supplemental channel and transmit the data over it. Thus, if the maximum allowed burst duration is less than the threshold burst duration—the transmission rate of the supplemental channel times the minimum allowed data size—then the data could be transmitted on the fundamental channel in less time than would be needed to set up the supplemental channel and transmit the data over it.

Therefore, if the maximum allowed burst duration is less then the threshold burst duration, i.e. the answer in step 455 is NO, then the leg of the handoff between the anchor base station and the mobile terminal is not stable enough to set up the supplemental channel on just this leg of the handoff. The process then proceeds to step 460 where it is determined if there are enough resources available at the base stations participating in the handoff to set up the supplemental channel on all the legs of the handoff. This can be performed in any manner, including the manner described above of with each base station in the soft handoff notifying a central location the transmission rate that it can support. If there are enough resources to set up the supplemental channel, the central location determines the transmission rate of the supplemental channel, each base station allocates the resources needed to support this transmission rate and the supplemental channel is set up on all of the legs of the handoff, step 465. The first of these legs is between the anchor base station and the mobile terminal, and each of the other legs is between one of the non-anchor base stations and the mobile terminal. All the base stations transmit equivalent data bursts, step 470. The process then returns to steps 430 and 445. If there are not enough resources for the supplemental channel, i.e. the answer in step 455 is NO, the process proceed to step 415 and transmits the data burst on the fundamental channel.

Steps 460, 465, and 470 are performed if the answer in step 455 is NO. If the answer in step 455 is YES, then the maximum allowed burst duration is greater than the threshold burst duration. This means that the leg of the handoff between the anchor base station and the mobile terminal is stable enough to set up the supplemental channel on just this leg of the handoff. The process then proceeds to step 475 where the anchor base station allocates the resources and sets up the supplemental channel. The anchor base station then transmits a data burst over the supplemental channel step 480. The duration of the burst of data is less than or equal to the maximum allowed burst duration. The process then returns to steps 430 and 445.

As described above, in FIG. 4 the stability of the forward link is determined based on 1) the characteristics of the anchor base station's pilot signal compared to the characteristics of the non-anchor base stations' pilot signals and 2) the changes of the characteristics of the anchor base station's pilot signal between two or more, illustratively consecutive, measurements of this pilot signal. The stability of the forward link can be determined based on other criteria. For example, in FIG. 6 the stability of the forward link is determined based on whether the mobile terminal is in soft handoff. The fact that the call is in soft handoff is an indication that the stability of the communication link has decreased and that at the maximum allowed burst length should be reduced, for example by dividing it by two. The size of this reduction is also selected as a tradeoff between the desire to be more sure that the anchor base station's forward link is stable and the desire to lengthen the time period between reported measurements.

The process of FIG. 6 operates similarly to the process of FIG. 4, except the steps of setting the time period between measurements to the initial time period between measurements, step 420, and the anchor monitoring process, 425, are replaces with step 610 of reducing the maximum allowed bust length if the call is in soft handoff. Therefore, the process of FIG. 6 provides the advantage of being easier to implement than the process of FIG. 4.

The illustrative embodiments described with reference to FIGS. 4, 5, and 6 were described with at least one of the parameters of the data being a function the stability of the communication link associated with one of the base stations participating in the handoff. One skilled in the art will realize that other presently known of future discovered indicia of future and/or current characteristics of the communication link can be similarly used instead of or in addition to stability.

The foregoing is merely illustrative and various alternatives will now be discussed. The illustrative embodiment is described with the base stations participating in a soft handoff. However, in alternative embodiments of the invention the base stations can be in softer handoff. A call is in softer handoff when the mobile terminal receives fairly strong pilot signals from two of more sets of communication equipment, typically located in the same base station, each set of communication equipment serving a different so-called sector of a cell of the wireless communication system. There is a leg of the handoff between each set of equipment and the mobile terminal. The operation of wireless communication system in establishing and operating the supplemental channel is similar for soft and softer handoff, with the exception that in softer handoff a smaller number of channel elements is required. When the same signal is transmitted over two sets of communication equipment the same channel element can be used to encode the signal with both a first so-called Walsh code for transmission over the one of the sets of communication equipment and with a second so-called Walsh code for transmission over the other of the sets of communication equipment.

In the illustrative embodiment if the maximum allowed burst duration is less then the threshold burst duration, i.e. the answer in step 455 is NO, then the process proceeds to step 460 to determine if there are enough resources available to set up the supplemental channel on all the legs of the handoff. In an alternative embodiment, the process can proceed to check if two of the legs of the handoff are coming from the same base station, in other words two of the legs of the handoff are in softer handoff. If there are two legs in softer handoff then the base station would set up the supplemental channel over those two legs and transmit the data burst over it. This is advantageous because the data burst is transmitted over two legs so there is a greater likelihood that it will be received at an acceptable level of signal quality, but since the signal transmitted in the data burst can share the same channel element, as described above, this supplemental channel does not require as many resources as one that was set up on legs from different base stations. If there were not two legs in softer handoff the process would proceed to step 460 and continue as described above.

In the illustrative embodiment if the supplemental channel cannot be set up over just one leg of the handoff, for example if the answer in step 450 or step 455 is NO, then the supplemental channel is set up on all the legs of the handoff or the data burst is transmitted on the fundamental channel. In an alternative embodiment of the invention, the supplemental channel can be set up over several, but fewer than all, legs of the handoff. These legs can be from the anchor base station and one or more of the non-anchor base stations, or they can be from several non-anchor base stations.

The illustrative embodiment is described with the wireless communication system being a CDMA system. However, in alternative embodiments the wireless communication system can be any system capable of soft or softer handoff.

The individual boxes in the flowcharts of FIGS. 4 and 5, and FIG. 6 are described as process steps. However, those boxes can be equally understood as representing program instructions stored in memory 235 and executed by controller 230, or another processor of wireless communication system 100, to effectuate the respective process steps.

The illustrative embodiment is described with three base stations participating in a soft handoff. However, in alternative embodiments any number of base stations can participate in the soft of softer handoff.

In the illustrative embodiments some of the process steps of FIGS. 4, 5, and 6 are performed in the primary base station. However, in alternative embodiment of the invention these steps can be performed in another part of the wireless communication system, for example in the MSC. For example, FIG. 2 shows that memory 235 includes supplemental channel software 250 and burst length software 255 that controller 230 can run this software to obtain the determinations of whether it is advantageous to set up the supplemental channel, the amount of resources available for the supplemental channel, and the maximum allowed burst duration. In alternative embodiments of the invention either or both of these pieces of software can be stored in any memory, and run on any processor.

In the illustrative embodiment the time period between reported measurements is reduced by dividing it and increased by multiplying it. In alternative embodiments of the invention, the time period between reported measurements can be reduced and/or increased in any manner. For example, the time period between reported measurements could be reduced by subtracting a certain time period.

In the illustrative embodiment the stability of the communication link associated with one of the base stations participating in the handoff is determined using the software, such as the burst length software. One skilled in the art will realize that in alternative embodiments hardware can be used to implement the functionality of this software.

In the illustrative embodiment, each base station includes a transmitter and data is transmitted from the base station to the mobile terminal. However, one skilled in the art will realize that data can be transmitted from the mobile terminal to base station in addition to, or instead of, from the base station to the mobile terminal using the methods described above. In such a case, the supplemental channel would be set up on the reverse communication link, each base station would include a receiver, and the anchor monitoring process for this link can be located at the primary base station, at the mobile terminal, or distributed between the two.

The illustrative embodiment is described using the current standards where a signal can be transmitted over a supplemental channel at the transmission rate of one, two, four, eight, sixteen, or thirty-two times that of the fundamental channel. However, one skilled in the art will recognize that the present invention can operate in systems where a signal can be transmitted over a supplemental channel using any transmission rate, including transmission rate that are not a multiple of the transmission rate of the transmission rate of the fundamental channel.

The illustrative embodiment is described using fundamental and supplemental channel. However, in alternative embodiments of the invention the channels can be any primary and secondary channel.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a system where data is transmitted during a handoff, the handoff having at least two legs each being between a terminal and one of at least two sets of communication equipment, the method comprising the steps of:

responsive to a deterioration in at least one of the characteristics of a communication link that is part of at least one of the legs, changing the maximum allowed burst duration;

establishing a secondary channel over just one leg responsive to the maximum allowed burst duration being at least as large as a threshold burst duration; and transmitting the data burst over the secondary channel.

2. The method of claim 1, further comprising the step of responsive to the maximum allowed burst duration being smaller than the threshold burst duration transmitting the data burst over the primary channel.

3. The method of claim 1, wherein:

each set of communication equipment includes a transmitter; and the communication link is a forward link.

4. The method of claim 1, wherein the characteristics of the communication link are obtained from a pilot strength measurement message.

5. The method of claim 1, wherein the characteristics of the communication link are based on characteristics of at least one pilot signal, each of the sets of the communication equipment transmitting one of the at least one pilot signals.

6. The method of claim 5, wherein the characteristics of the at least one pilot signal comprise whether an anchor set of the sets of communication equipment remains as the anchor set.

7. The method of claim 5, wherein the characteristics of at least one pilot signal comprise a strength of a pilot signal of an anchor set of the sets of communication equipment for a first predetermined number of measurements.

8. The method of claim 1, wherein the characteristics of the communication link are based on at least one of the following characteristics:

whether an anchor set of the sets of communication equipment remains as the anchor set;

a strength of a pilot signal of an anchor set of the sets of communication equipment for a first predetermined number of measurements;

the strength of the pilot signal of the anchor set of the sets communication equipment relative to a strength of a pilot signal of a non-anchor set of the sets of communication equipment;

the rate of change of the strength of the pilot signal of the anchor set of the sets of communication equipment; and the rate of change of the strength of the pilot signal of the anchor set of the sets of communication equipment for a second predetermined number of measurements.

9. The method of claim 1 wherein the characteristics of the communication link are based on characteristics of a signal on a secondary channel.

10. A method for use in a system where a burst of data is transmitted during a handoff, the handoff having at least two legs each being between a terminal and one of at least two sets of communication equipment, the method comprising the steps of:

transmitting a first burst of data over just one of the legs using a first plurality of burst parameters;

responsive to a deterioration in at least one of the characteristics of a communication link that is part of at least one of the legs, selecting a second plurality of burst parameters where the maximum allowed burst duration of the second plurality is different from the first plurality of burst parameters;

establishing a secondary channel over just one leg responsive to the maximum allowed burst duration being at least as large as a threshold burst duration; and transmitting the data burst over the secondary channel.

11. The method of claim 10, further comprising the steps of responsive to the maximum allowed burst duration being smaller than the threshold burst duration transmitting the data burst over the primary channel.

12. The method of claim 10, wherein:

each set of communication equipment includes a transmitter; and the communication link is a forward link.

13. The method of claim 10, wherein the characteristics of the communication link are obtained from a pilot strength measurement message.

14. The method of claim 10, wherein the characteristics of the communication link are based on characteristics of at least one pilot signal, each of the sets of the communication equipment transmitting one of the at least one pilot signals.

15. The method of claim 14, wherein the characteristics of the at least one pilot signal comprise whether an anchor set of the sets of communication equipment remains as the anchor set.

16. The method of claim 14, wherein the characteristics of at least one pilot signal comprise a strength of a pilot signal of an anchor set of the sets of communication equipment for a first predetermined number of measurements.

17. The method of claim 10, wherein the characteristics of the communication link are based on at least one of the following characteristics:

whether an anchor set of the sets of communication equipment remains as the anchor set;

a strength of a pilot signal of an anchor set of the sets of communication equipment for a first predetermined number of measurements;

the strength of the pilot signal of the anchor set of the sets communication equipment relative to a strength of a pilot signal of a non-anchor set of the sets of communication equipment;

the rate of change of the strength of the pilot signal of the anchor set of the sets of communication equipment; and the rate of change of the strength of the pilot signal of the anchor set of the sets of communication equipment for a second predetermined number of measurements.

18. The method of claim 10, wherein the characteristics of the communication link are based on characteristics of a signal on a secondary channel.

19. A method for use in a system where a burst of data is transmitted during a handoff, the handoff having at least two legs each being between a terminal and one of at least two sets of communication equipment, the method comprising the steps of:

determining a maximum allowed burst duration as a function of the characteristics of a communication link that is part of at least one of the legs;

establishing a secondary channel over just one leg responsive to the maximum allowed burst duration being at least as large as a threshold burst duration; and transmitting the data burst over the secondary channel.

20. The method of claim 19, further comprising the step of responsive to the maximum allowed burst duration being smaller than the threshold burst duration transmitting the data burst over the primary channel.

21. The method of claim 19, wherein:

each set of communication equipment includes a transmitter; and the communication link is a forward link.

22. The method of claim 19, wherein the characteristics of the communication link are obtained from a pilot strength measurement message.

23. The method of claim 19, wherein the characteristics of the communication link are based on characteristics of at least one pilot signal, each of the sets of the communication equipment transmitting one of the at least one pilot signals.

24. The method of claim 23, wherein the characteristics of the at least one pilot signal comprise whether an anchor set of the sets of communication equipment remains as the anchor set.

25. The method of claim 23, wherein the characteristics of at least one pilot signal comprise a strength of a pilot signal of an anchor set of the sets of communication equipment for a first predetermined number of measurements.

26. The method of claim 19, wherein the characteristics of the communication link are based on at least one of the following characteristics:

whether an anchor set of the sets of communication equipment remains as the anchor set;

a strength of a pilot signal of an anchor set of the sets of communication equipment for a first predetermined number of measurements;

the strength of the pilot signal of the anchor set of the sets communication equipment relative to a strength of a pilot signal of a non-anchor set of the sets of communication equipment;

the rate of change of the strength of the pilot signal of the anchor set of the sets of communication equipment; and the rate of change of the strength of the pilot signal of the anchor set of the sets of communication equipment for a second predetermined number of measurements.

27. The method of claim 19, wherein the characteristics of the communication link are based on characteristics of a signal on a secondary channel.

* * * * *